(12) United States Patent
Piedrabuena (10) Patent No.: US 11,178,997 B2
(45) Date of Patent: Nov. 23, 2021

(54) MACHINE FOR DISPENSING AN ICE BEVERAGE

(71) Applicant: Innovative Vending Pty Ltd, Endeavour Hills (AU)

(72) Inventor: Rodolfo Piedrabuena, Endeavour Hills (AU)

(73) Assignee: INNOVATIVE VENDING PTY LTD, Endeavour Hills (AU)

( * ) Notice: Subject to any disclaimer, the term of this patent is extended or adjusted under 35 U.S.C. 154(b) by 747 days.

(21) Appl. No.: 15/767,088

(22) PCT Filed: Sep. 29, 2016

(86) PCT No.: PCT/AU2016/050918
§ 371 (c)(1),
(2) Date: Apr. 9, 2018

(87) PCT Pub. No.: WO2017/059483
PCT Pub. Date: Apr. 13, 2017

(65) Prior Publication Data
US 2018/0289203 A1 Oct. 11, 2018

(30) Foreign Application Priority Data
Oct. 9, 2015 (AU) ................................ 2015904117

(51) Int. Cl.
*A47J 31/41* (2006.01)
*A47J 31/40* (2006.01)
(Continued)

(52) U.S. Cl.
CPC ............ *A47J 31/401* (2013.01); *A23G 9/045* (2013.01); *A47J 31/41* (2013.01); *A47J 31/44* (2013.01);
(Continued)

(58) Field of Classification Search
CPC .......... A47J 31/41; A47J 31/402; A23G 9/045
(Continued)

(56) References Cited

U.S. PATENT DOCUMENTS

| 1,983,239 | A | * | 12/1934 | Munday | ................... | G01F 19/00 |
| | | | | | | 285/55 |
| 4,276,750 | A | * | 7/1981 | Kawasumi | ............... | B67D 1/00 |
| | | | | | | 62/137 |

(Continued)

*Primary Examiner* — Reginald Alexander
(74) *Attorney, Agent, or Firm* — Lathrop GPM LLP (57) ABSTRACT

A machine (1) for dispensing an ice beverage in the form of a pourable homogenous mixture of ground ice, liquid and flavour ingredients such as fruit, vegetables, fruit juice, milk, yoghurt or the like. The machine (1) includes a blending unit (3) for blending the constituents of the ice beverage, and an ice dispensing unit (5) for supplying ice to the blending unit (3). The ice dispensing unit (5) includes a portion control device for measuring a predetermined quantity of ice required for blending. The blending unit (3) includes a bendable spout (41) for selectively releasing blended constituents from the blending unit (3). The ice dispensing unit (5) is advantageously able to dispense accurate portions of ice and does not require connection to an external water line or access to a floor drain. The blending unit (3) is advantageously able to produce and pour an ice beverage without requiring a blending container (43) of the unit (3) to be tilted, turned upside down and shaken.

15 Claims, 9 Drawing Sheets

(51) Int. Cl.
*A47J 31/44* (2006.01)
*A47J 43/27* (2006.01)
*A47J 43/046* (2006.01)
*A23G 9/04* (2006.01)
*A47J 43/07* (2006.01)

(52) U.S. Cl.
CPC ......... *A47J 43/046* (2013.01); *A47J 43/0722* (2013.01); *A47J 43/27* (2013.01); *A47J 31/402* (2013.01)

(58) Field of Classification Search
USPC ......... 99/287, 290; 222/77, 132, 146.6, 527; 62/1, 389
See application file for complete search history.

(56) References Cited

U.S. PATENT DOCUMENTS

| | | | | |
|---|---|---|---|---|
| 5,619,901 | A * | 4/1997 | Reese | A23G 9/045 222/132 |
| 2005/0274749 | A1* | 12/2005 | Labossiere | B05C 17/00596 222/527 |
| 2010/0151083 | A1* | 6/2010 | Klier | B67D 1/0034 426/66 |
| 2010/0242497 | A1* | 9/2010 | Bertone | B67D 1/0053 62/1 |
| 2013/0043337 | A1* | 2/2013 | Rukavina | A47J 31/40 241/68 |
| 2014/0212566 | A1* | 7/2014 | Herbert | A23G 9/045 426/590 |

* cited by examiner

MACHINE FOR DISPENSING AN ICE BEVERAGE

CROSS-REFERENCE TO RELATED APPLICATIONS

This application is a U.S. National Stage Application filed under 35 U.S.C. § 371 of International Application No. PCT/AU2016/050918, filed Sep. 29, 2016, which claims the benefit of Australian Application No. 2015904117, filed Oct. 9, 2015. Both of these applications are hereby incorporated by reference in their entireties.

FIELD OF THE INVENTION

The present invention relates to a machine for dispensing an ice beverage, for example a vending machine. As the machine is particularly suited for dispensing an ice based beverage of the type known as a smoothie, it will be convenient to describe the invention with reference to this particular type of beverage.

BACKGROUND TO THE INVENTION

The phrase "ice beverage", as used herein, refers to a beverage being in a generally slush state, i.e. a pourable mixture of ground ice and liquid wherein the mixture is generally homogeneous. The ground ice is composed of ice particles or flakes. The term "smoothie", as used herein, refers to a particular form of ice beverage which consists of a blend of ice and one or more flavour ingredients, for example, fruit, vegetables, fruit juice, milk, yoghurt or the like.

A known method for producing ice beverages requires continuously mixing a mixture which is chilled to a partial frozen state. The process of cooling the liquid into a ready to serve ice beverage typically takes between 20-60 minutes, during which time the ice beverage cannot be served. The process of preparing an ice beverage can also be substantially labour intensive and is typically performed by trained personnel.

Known machines for dispensing ice beverages are generally of complex construction and have limited capacity and an inability to provide a continuous supply of a large number of beverage servings.

Further, most known machines for dispensing ice beverages require use of an ice maker connected to a mains water line and also require access to a floor drain to eliminate melted ice resulting from the storage of ice flakes within non-frozen compartments of the machine. Meeting the requirements of mains connection and a floor drain makes finding a suitable location to operate a vending machine difficult. In this regard, new sites may involve major costs and disruption in order to provide the required services for the machine.

It would be desirable to provide a machine for dispensing an ice beverage which is of reduced complexity and provides a useful alternative to known machines.

Any discussion of documents, devices, acts or knowledge in this specification is included to explain the context of the invention. It should not be taken as an admission that any of the material formed part of the prior art base or the common general knowledge in the relevant art on or before the priority date of the claims herein.

SUMMARY OF THE INVENTION

In accordance with a first aspect of the invention there is provided a machine for dispensing an ice beverage, the machine includes a blending unit for blending the constituents of an ice beverage, and an ice dispensing unit for supplying ice to the blending unit, the ice dispensing unit includes a portion control device for measuring a predetermined quantity of ice required for blending, the blending unit includes a bendable spout for selectively releasing blended constituents from the blending unit.

The ice dispensing unit may further include a storage compartment for storing ice, the storage compartment being operatively connected to the portion control device.

The portion control device may include a chute operatively connected between the storage compartment and the blending unit. The portion control device may further include a first closure and a second closure spaced apart for selectively closing a section of the chute. The first closure is advantageously positioned towards the storage compartment and the second closure is advantageously positioned towards the blending unit. Ice from the storage compartment is able to accumulate in the chute before being released to the blending unit, after the ice accumulated reaches the predetermined quantity. The first closure is advantageously in an open position and the second closure is advantageously in a closed position when ice is accumulating to the predetermined quantity.

The portion control device may further include a sensor for detecting when ice accumulated in the chute reaches the predetermined quantity.

The storage compartment may include a lower platform having an annular trough with a discharge opening provided in a bottom area of the trough. The discharge opening is preferably connected to a first end of the chute.

The ice dispensing unit may further include an ice agitator for urging ice particles through the discharge opening. The ice agitator may include a rotary shaft and a plurality of radial arms extending outwardly from the rotatory shaft. At least a section of each radial arm may substantially conform to a contour of the annular trough.

The annular trough of the lower platform preferably includes one or more upwardly projecting ice crusher blades for reducing the size of ice particles.

The ice dispensing unit may further include a geared motor operatively connected to the ice agitator to drive rotation of the rotary shaft.

The ice dispensing unit may further include a control unit for controlling operation of the geared motor and the first and second closures. In response to the sensor detecting that the ice accumulated in the chute has reached a predetermined quantity, the control unit stops the geared motor and activates the first closure to close and the second closure to open, thereby allowing the predetermined quantity of ice to be released into the blender unit.

The portion control device may further include an ice push mechanism for pushing ice particles through the chute and into the blending unit. In this regard, the ice push mechanism is preferably controlled by the control unit.

The blending unit may further include an actuating mechanism for imparting movement to the bendable spout. In this regard, the actuating mechanism is preferably controlled by the control unit.

The bendable spout is preferably moveable by the actuating mechanism between a folded position, in which blended constituents are restrained from release, and an unfolded position, in which blended constituents are released from the spout.

The actuating mechanism preferably includes a spool, a drive motor for rotating the spool, and a cable operatively connected to the bendable spout and the spool. When the spool is rotated by the drive motor in a first direction, the spout is advantageously moved to the folded position and when the spool is rotated by the drive motor in an opposite second direction, the spout is moved to an unfolded position.

The actuating mechanism may further include first and second pulleys positioned on either side of the spool, with the cable extending around the pulleys between the spool and the spout.

In accordance with a further aspect of the invention, there is provided an ice dispensing unit for storing and delivering ice to a blending unit of a machine for dispensing an ice beverage, the ice dispensing unit including a storage compartment for storing ice, and a portion control device for measuring a predetermined quantity of ice required for blending, the portion control device includes a chute operatively connected to the storage compartment, wherein ice from the storage compartment accumulates in the chute before being released for dispense to the blending unit, after the ice accumulated reaches the predetermined quantity.

There is also described a blending unit for blending the constituents of a beverage in a machine for dispensing a beverage. The blending unit includes a bendable spout for selectively releasing blended constituents from the blending unit, and an actuating mechanism for controlling operation of the spout, wherein, in response to the actuating mechanism, the spout is bendable between a folded position in which blended constituents are restrained from release and an unfolded position in which the blended constituents are released for dispense to an underlying beverage container.

DESCRIPTION OF PREFERRED EMBODIMENTS

Figure 1:
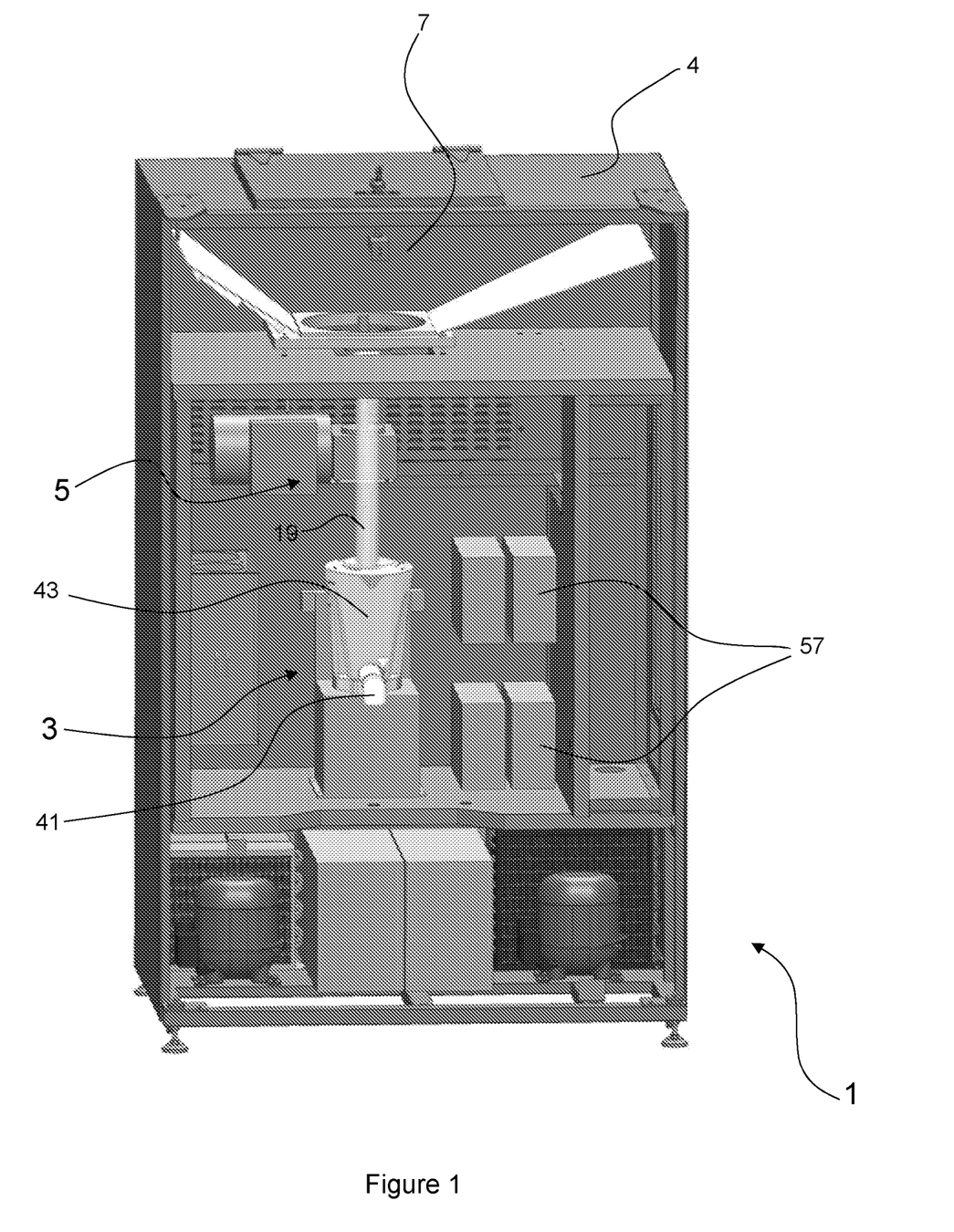
FIG. 1 is a front view of a machine for dispensing an ice beverage which illustrates various internal components of the machine, in accordance with a preferred embodiment.

With reference to FIG. 1 there is shown the internal components of a self-contained made-to-order smoothie vending machine 1 for dispensing an ice beverage containing a blend of ice and one or more selected flavour ingredients. The internal components of the machine 1 in FIG. 1 are housed in an outer body casing 4 which is illustrated with its exterior front door omitted. The machine 1 includes a blending unit 3 for blending the constituents of the ice beverage. The machine 1 further includes an ice dispensing unit 5 for supplying ice particles for the beverage to the blending unit 3. The ice dispensing unit 5 includes a storage compartment 7 for storing ice, and a portion control device 9, preferably positioned underneath the storage compartment 7, for measuring a predetermined quantity of ice required for blending by the blending unit 3.

The storage compartment 7 is preferably refrigerated and capable of storing a large quantity of fragmented ice, for example 50 kilograms. The ice stored in the storage compartment 7 can be of any type, for example crushed, nugget, flaked or cubed ice. In a particularly preferred embodiment, the storage compartment 7 may be a below 0° Celsius refrigerated container, for example, a container wherein side walls are cooled by a flow of refrigerant gas cooled by a refrigeration cycle, for example, a vapour compression cycle that includes a compressor, condenser, expansion valve and evaporator. One or more side walls of the storage compartment 7 are also preferably angled such the stored ice migrates under gravity towards a bottom section of the storage compartment 7 for subsequent discharge to the portion control device.

Figure 2:
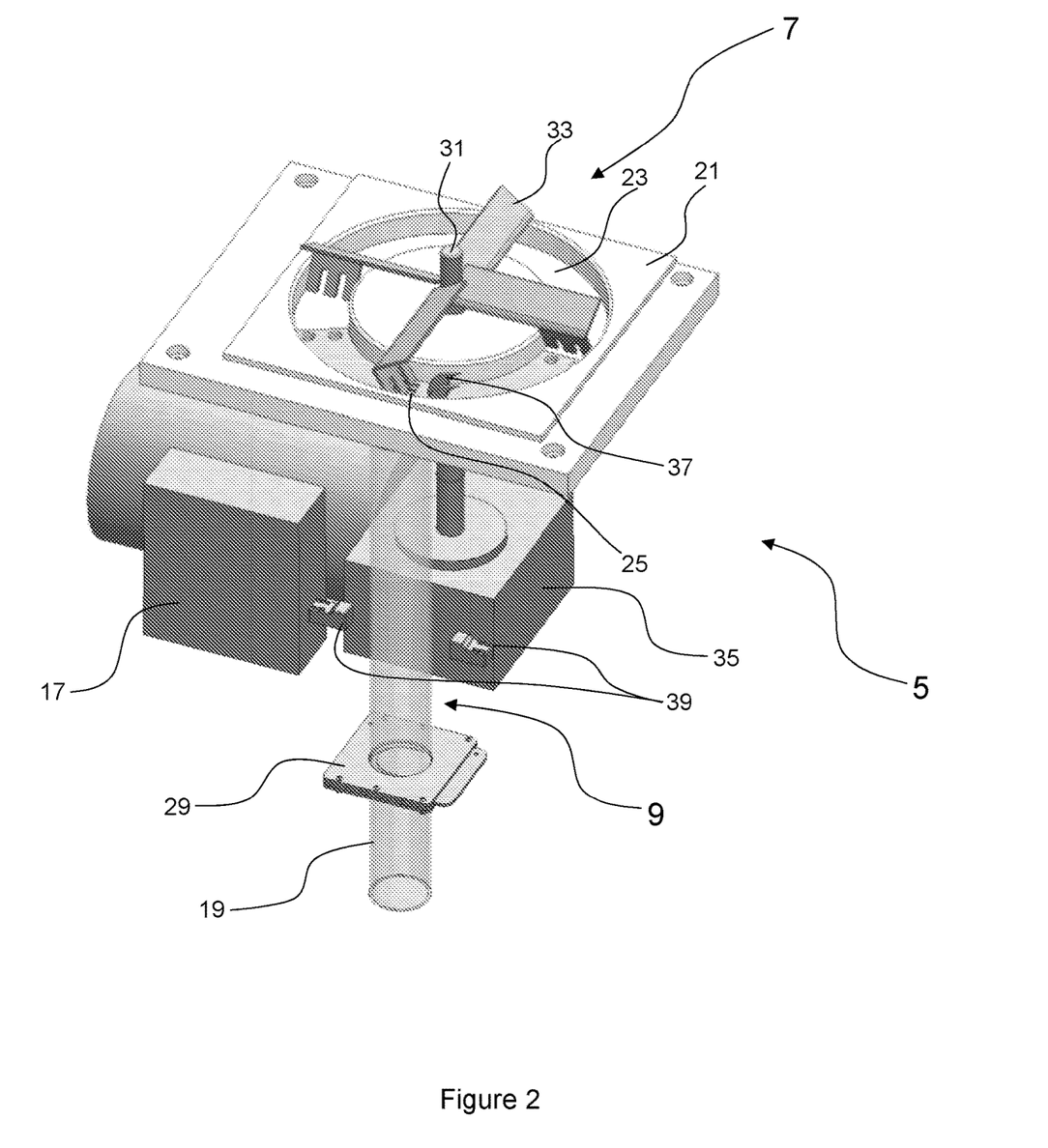
FIG. 2 is a top perspective view of a portion of the bottom section of the storage compartment and various components of the ice dispensing unit of the machine illustrated in FIG. 1, with the second closure of the portion control device being illustrated in a closed position for ice accumulation within the chute.
Figure 5:
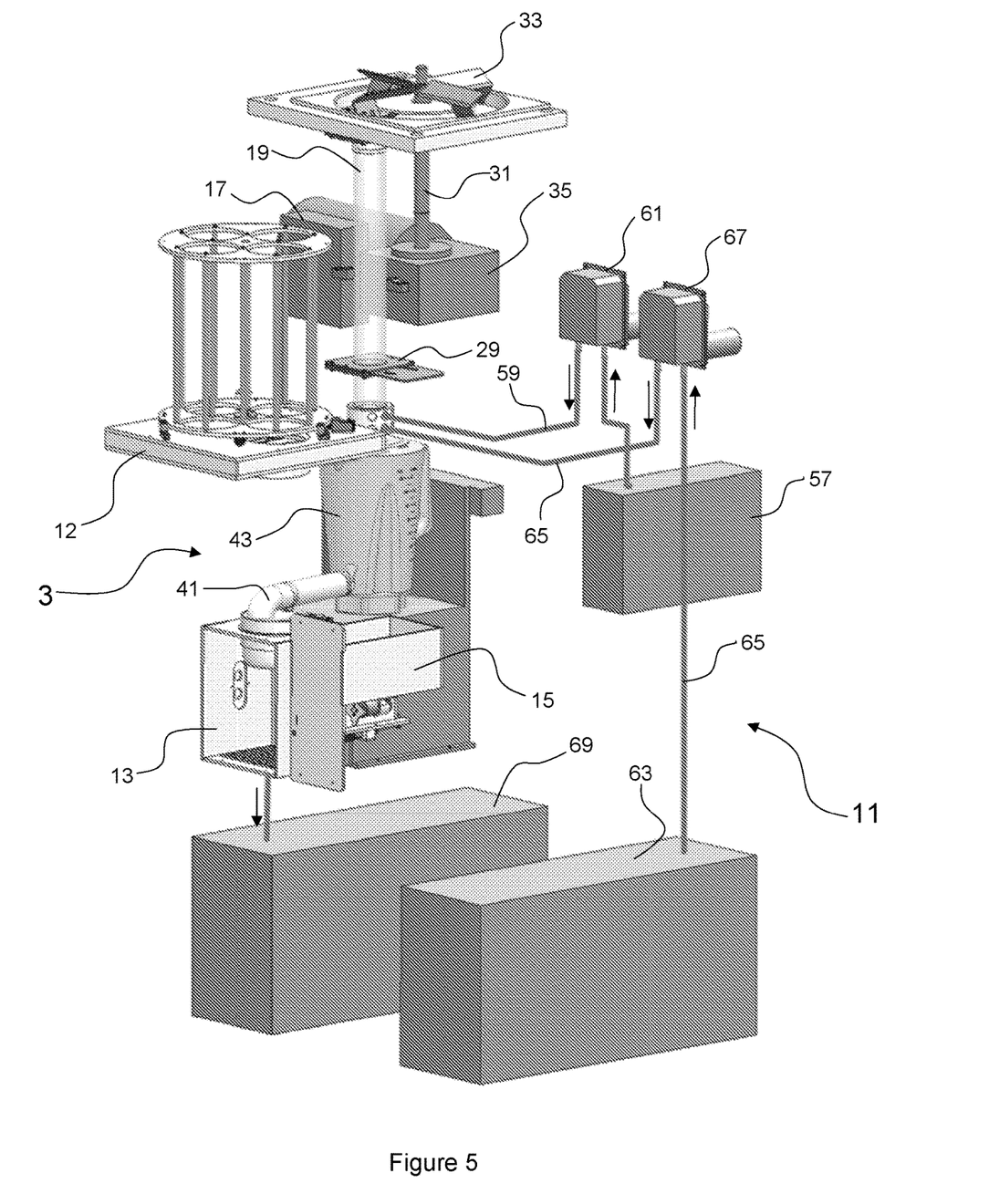
FIG. 5 is a side perspective view of various internal components of the machine illustrated in FIG. 1 including a rinsing and washing system.
Figure 6:
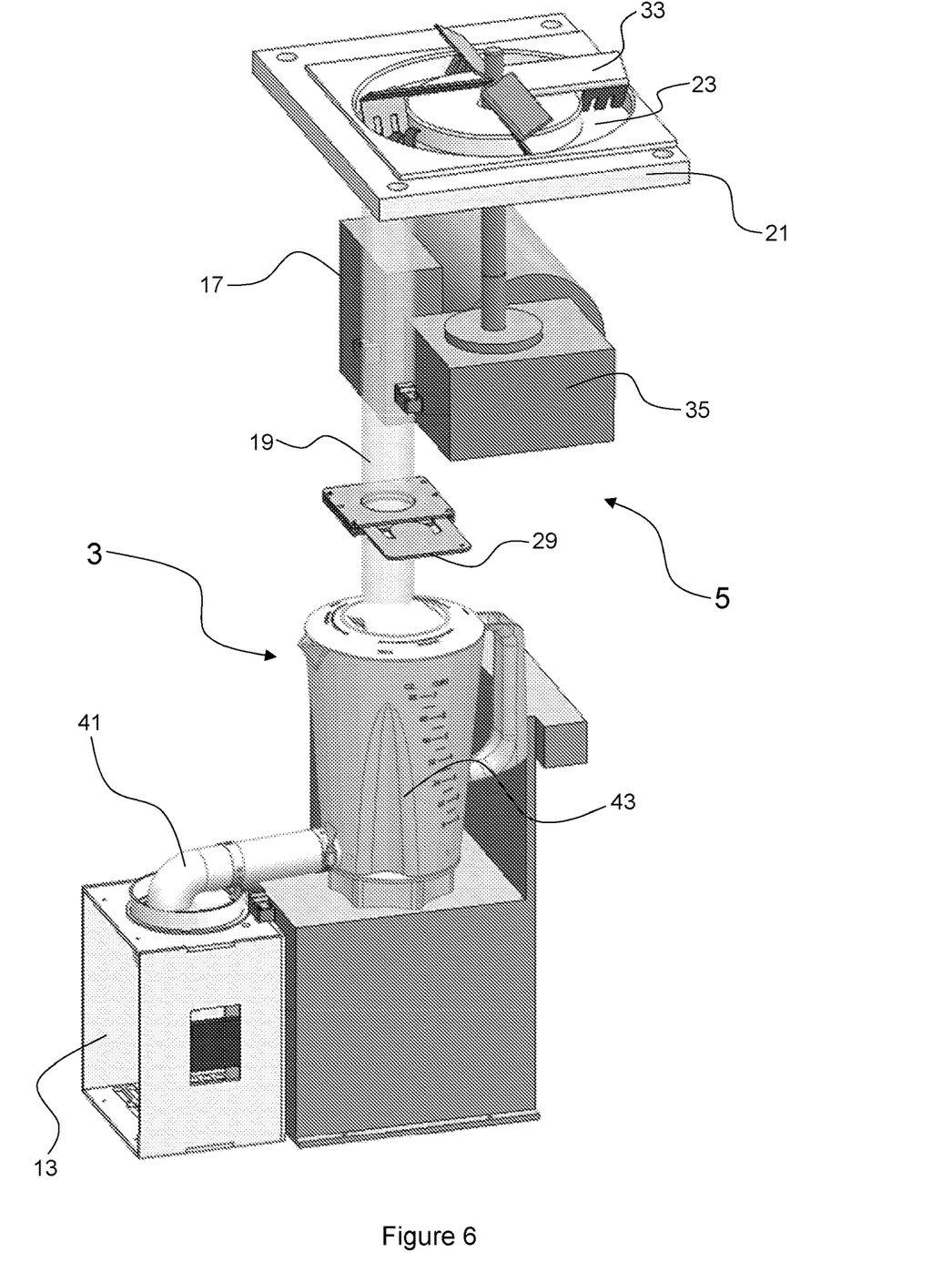
FIG. 6 is a side perspective view of various components of the machine illustrated in FIG. 1.

The portion control device of the ice dispensing unit 5 preferably includes a chute 19 positioned between the storage compartment 7 and the blending unit 3. One end of the chute 19 is operatively connected to the storage compartment 7. In this regard, as shown in FIG. 2, the bottom of the storage compartment includes a lower platform 21 having an annular trough 23 with a discharge opening 25 provided in a bottom area of the trough 23 to which a first end of the chute 19 is connected. A second or bottom end of the chute 19 preferably overlies the blending unit 3, as shown in FIGS. 5 and 6.

Figure 3:
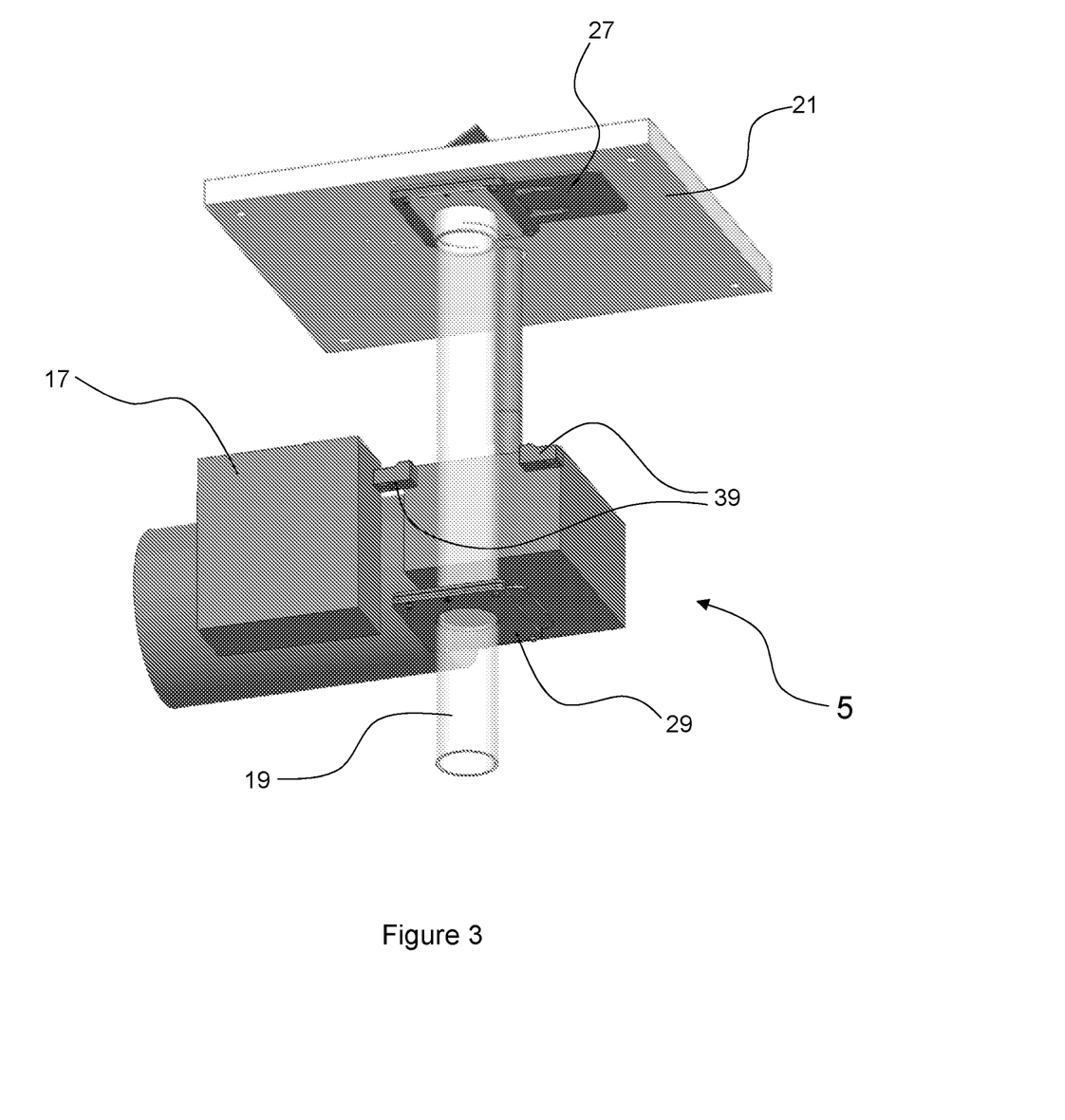
FIG. 3 is a side perspective view of a portion of the underside of the storage compartment and ice dispensing unit shown in FIG. 2 with the first closure of the portion control device being illustrated in an open position and the second closure of the portion control device being illustrated in a closed position for accumulation of ice within the chute.
Figure 4:
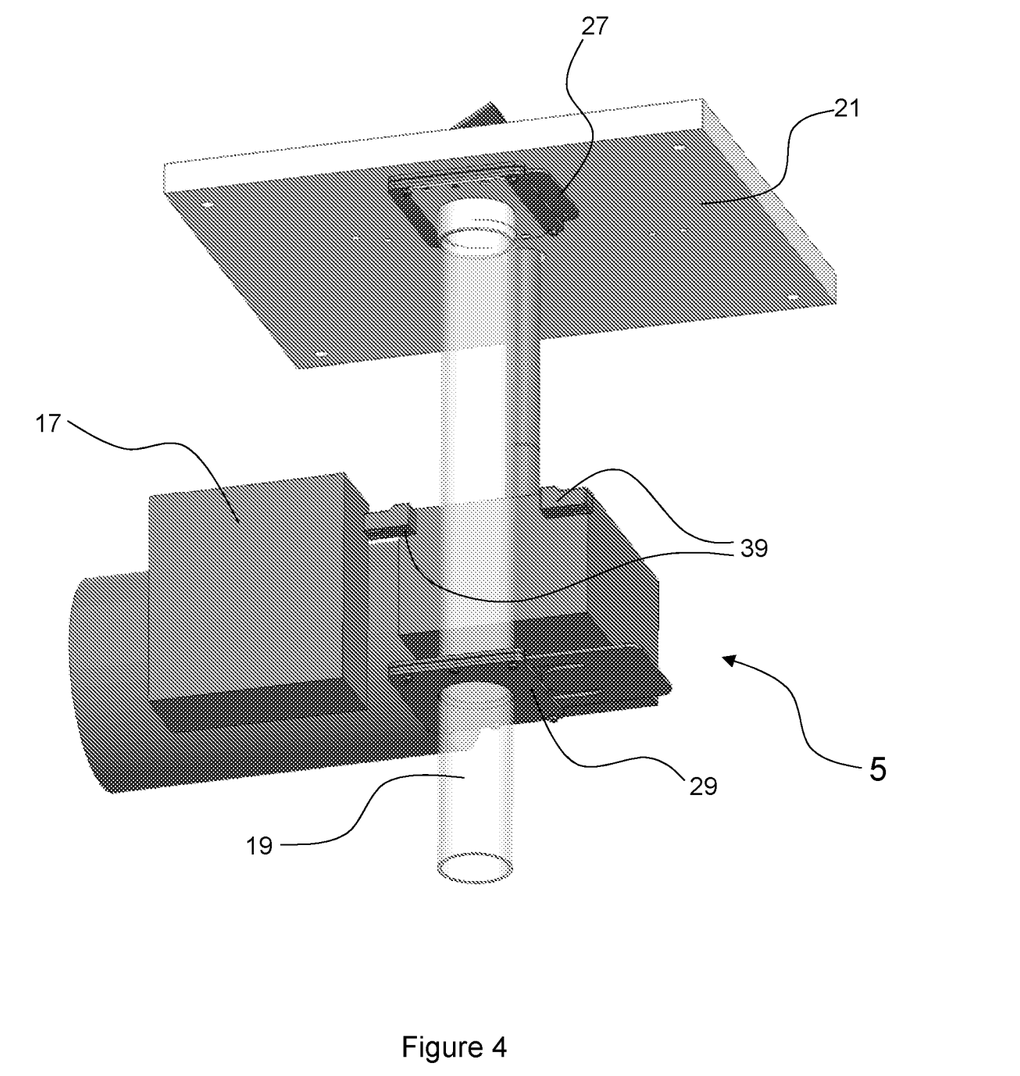
FIG. 4 is a side perspective view of a portion of the underside of the storage compartment and ice dispensing unit illustrated in FIG. 2 with the first closure being in a closed position and the second closure being in an open position for release of accumulated ice from the chute.

With reference to FIGS. 3 and 4, the portion control device further includes a first closure which is preferably in the form of a first sliding gate 27 positioned underneath the lower platform 21 of the storage compartment in the vicinity of the discharge opening. In this regard, the first sliding gate 27 is preferably aligned with the discharge opening of the storage compartment. The portion control device further includes a second closure which is preferably in the form of a second sliding gate 29. The second sliding gate 29 is preferably positioned towards a lower end of the chute 19 which leads towards the blending unit. When the second sliding gate 29 is closed, as shown in FIGS. 2 and 3, ice within the chute 19 is prevented from being released to the underlying blending unit.

With reference to FIG. 2, the ice dispensing unit 5 further includes an ice agitator for urging ice particles through the discharge opening 25 provided in the bottom of the annular trough 23 of the storage compartment. The ice agitator preferably includes a rotary shaft 31 and a plurality of radial arms 33 extending outwardly from the rotary shaft 31. With reference to FIGS. 2 and 5, the ice dispensing unit further includes a geared motor 35 operatively connected to the rotary shaft 31 to drive rotation. In this regard, the geared motor 35 preferably drives the rotary shaft 31 and affixed radial arms 33. Operation of the geared motor 35 driving the rotary shaft 31 is advantageously controlled by the control unit 17. The control unit 17 also advantageously controls operation of the first sliding gate 27 and the second sliding gate 29.

Rotation of the radial arms 33 urges quantities of ice particles around the annular trough 23 to be discharged through the discharge opening 25. When the first sliding gate 27 is in the open position and the second sliding gate 29 is in the closed position, as depicted in FIG. 3, ice particles are able to accumulate within a section of the chute 19 after gravitating through the first end of the chute 19 from the discharge opening 25.

At least a portion of each radial arm 33 of the ice agitator substantially conforms with the contours of the annular trough 23 and serve to engage within the mass of ice within the storage compartment 7 to cause agitation thereof upon rotation of the rotary shaft 31. The annular trough 23 may optionally include one or more upwardly projecting ice crusher blades 37 for assisting in the migration of ice and reducing the size of ice particles. The rotation of the radial arms 33 alternately squeezes and releases the mass portion of ice, thereby imparting tremor-like movements to the mass, both radially and vertically, to help maintain the ice in the form of discreet particles. The ice crusher blades 37 also advantageously assist to provide a more consistent volume of ice exiting the storage compartment 7.

With reference to FIGS. 2 to 4, the portion control device of the ice dispensing unit 5 also preferably includes one or more sensors 39 for detecting when ice accumulating in the chute 19 reaches the predetermined quantity. In this regard, the one or more sensors 39 preferably detect when a predetermined ice level within the chute 19 has been reached. Alternatively, the sensors 39 could determine when the predetermined quantity of accumulated ice is reached by detecting the weight of accumulated ice particles within the chute 19.

When the one or more sensors 39 detect the ice accumulated in the chute 19 has reached the predetermined quantity, the control unit 17 activates closure of the first sliding gate 27. Simultaneously, the control unit 17 stops the geared motor 35 and activates the opening of the second sliding gate 29, thereby allowing the accumulated ice particles to be released from the chute 19 and into the blender unit 3. In a particularly preferred embodiment, the portion control device may further include an ice push mechanism (not illustrated in the drawings) for pushing ice particles through the chute 19 and into the blender unit 3. The ice push mechanism is advantageously controlled by the control unit 17. In a further embodiment, an air pump may be utilized to blow air towards the second sliding gate 29 to thereby help prevent ice blockages within the chute 19.

Figure 7:
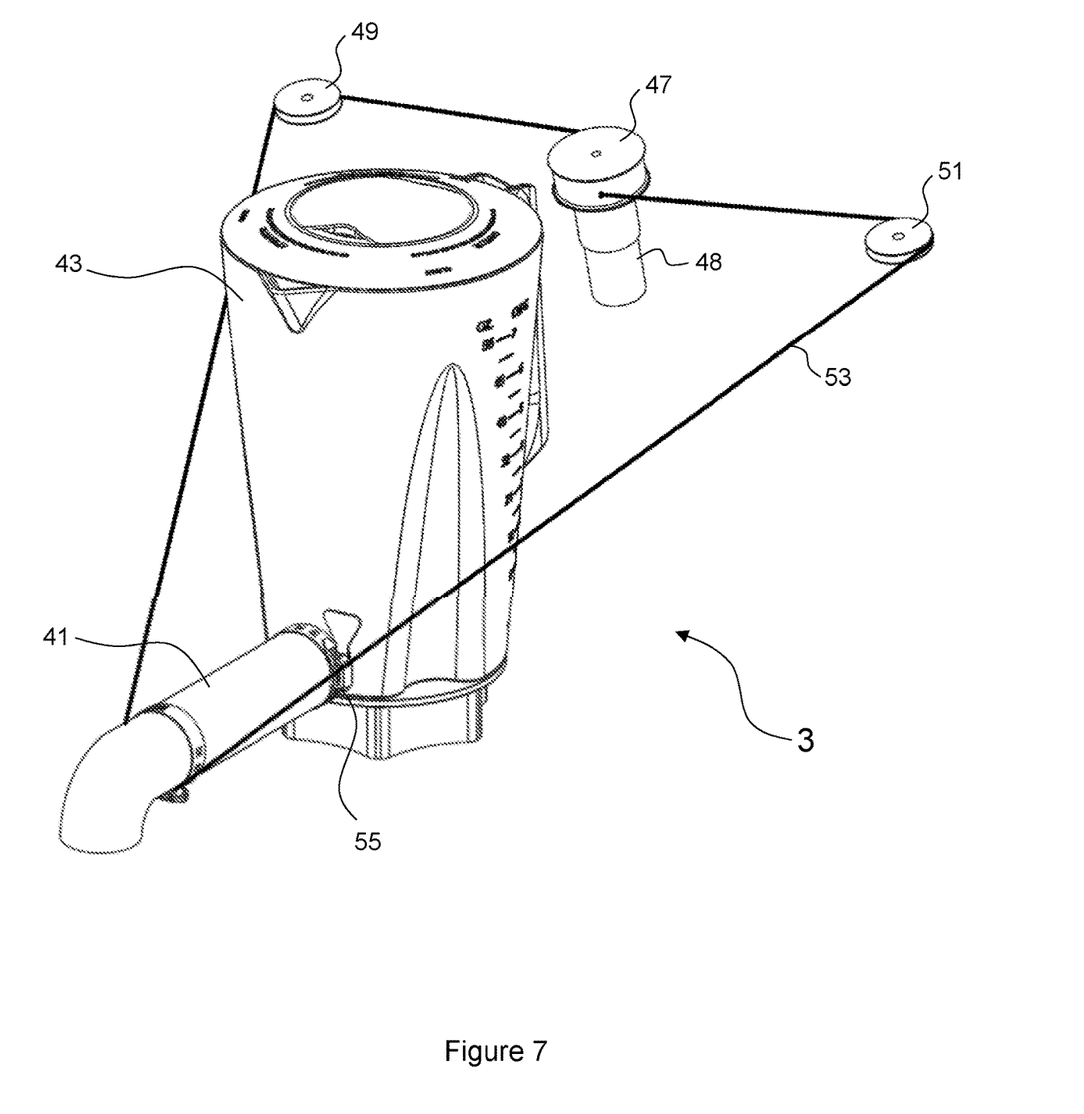
FIG. 7 is a perspective view of various components of the blending unit with the bendable spout being shown in a fully unfolded position.
Figure 8:
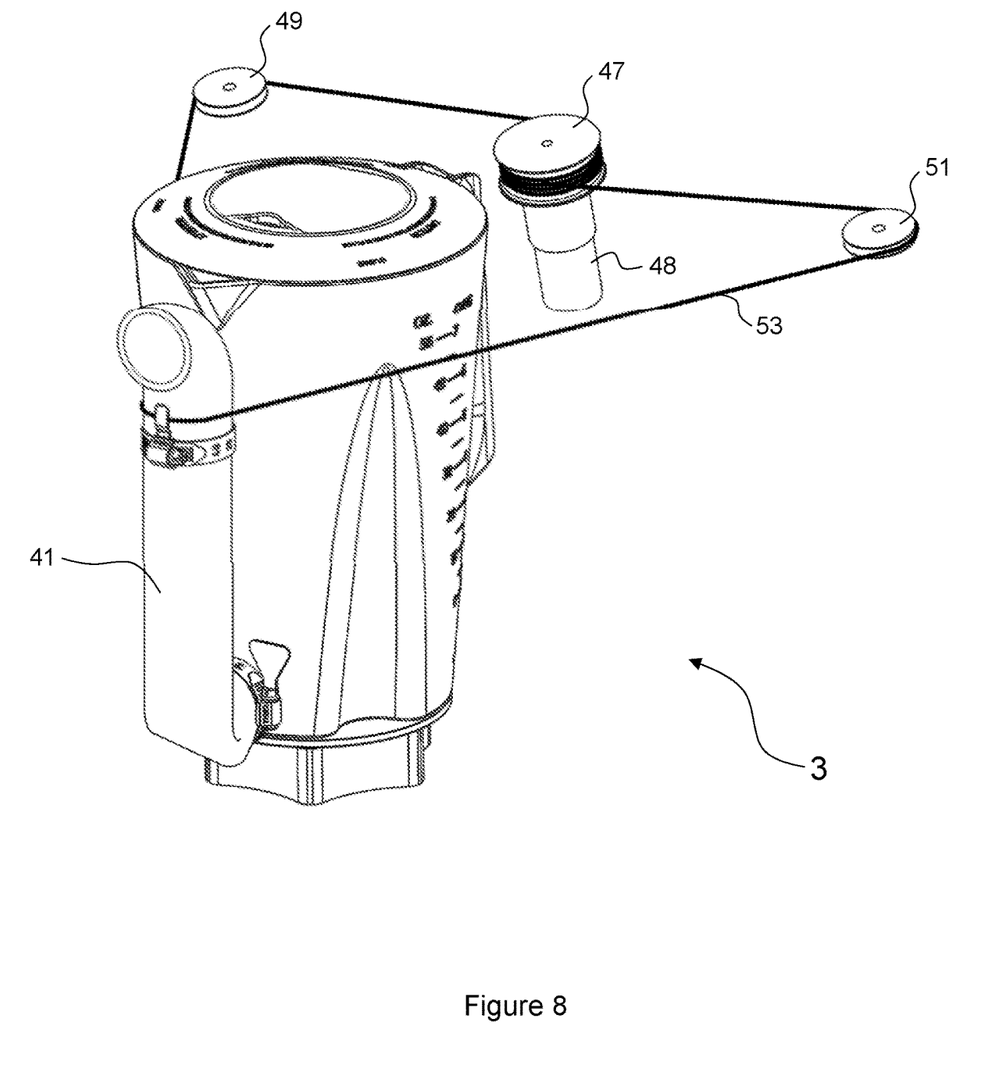
FIG. 8 is a perspective view of various components of the blending unit with the bendable spout being shown in a fully folded position.

The blending unit 3 includes a bendable spout 41 for selectively releasing blended constituents from the blending unit 3. In this respect, the blending unit 3 further includes a blending container 43 in which blending of the constituents of an ice beverage occurs. The blending container 43 shown in the figures is a modified conventional blender as used in the initial prototype of the machine 1. The blending container 43 is shown as a conventional blender for convenience only and could be of any particular shape and configuration. The bendable spout 41 projects from a lower portion of the blending container 43. With reference to FIGS. 7 and 8, the blending unit 3 further includes an actuating mechanism controlled by the control unit 17 for imparting movement to the bendable spout 41. The bendable spout 41 is moveable by the actuating mechanism between a folded position (as shown in FIG. 8) in which the blended constituents of the blending container 43 are restrained from release from the bendable spout 41, and an unfolded position (as illustrated in FIGS. 5, 6 and 7) in which the blended constituents of the blending container 43 are releasable from the bendable spout 41.

As best shown in FIGS. 7 and 8, the actuating mechanism includes a spool 47 and a drive motor 48 for rotating the spool 47. The actuating mechanism may further include first and second pulleys 49, 51 positioned to either side of the spool 47, and a cable 53 which operatively connects the bendable spout 41 and the spool 47. The cable 53 further extends around the first and second pulleys 49, 51 to prevent the cable from contacting the side walls of the blending container 43. When the spool 47 is rotated by the drive motor in a first direction, the bendable spout 41 is moved to the folded position (as depicted in FIG. 8) and when the spool 47 is rotated by the drive motor in an opposite second direction, the bendable spout 41 is moved to a fully unfolded position (as depicted in FIG. 7). In this respect, the cable 53 is unwounded from the spool 47 which enables the bendable spout 41 to pivot downwardly towards the fully unfolded position in which the bendable spout 41 extends substantially perpendicular to the blending container 43. When the spool 47 is rotated by the drive motor in the opposite direction, the cable 53 is winded around the spool 47 thereby pulling the bendable spout 41 towards a fully folded closed position in which the bendable spout 41 lies substantially parallel to the side walls of the blending container 43. The bendable spout 41 may be attached to the blending container 43 by an adjustable clamp 55. In a particular preferred embodiment, the bendable spout 41 is made of a flexible conduit.

With reference to FIG. 5, the machine 1 in accordance with an embodiment of the invention further includes a self-contained rinsing and washing system 11 for rinsing and/or washing the blending unit 3; a cup dispenser 12 and a cup station 13 for dispensing a beverage cup for the blending unit 3; a straw dispenser 15 for dispensing a straw; a computerised control unit 17; an associated user interface (not illustrated in the drawings); one or more flavour ingredient or food stuff containers 57 and a mechanism, for example a pump 61, for transferring the stored food stuff/flavour ingredients from the one or more containers 57 to the blending unit 3. Alternatively the transfer of ingredients to the blending unit 3 may occur by gravity.

The one or more flavour ingredients or foodstuff containers 57 are preferably connected to the blending unit 3 via one or more conduits 59. The associated transfer pump 61 is operatively controlled by the control unit 17. The self-contained rinsing and washing system 11 preferably includes a washing water tank or container 63 which is connected to the blending unit 3 by a pipeline 65 which includes a washing water pump 67 for pumping wash water stored within the wash water container 63 to the blending unit 3. In an alternative embodiment, the water container 63 may optionally be used for storing water to be used as a beverage ingredient. A water heating system may also be provided to provide hot water for washing. A load cell may also be located beneath the blending container 43 to monitor the weight of ingredients supplied to the blending container 43. In another embodiment, the blending unit 3 may include flow sensors associated with each ingredient to detect the volume of each supplied ingredient. A sensor may also be used to detect the supplied level of ingredients within the blending container 43. The machine 1 may also include a flood detection system to detect and transport any spillage of liquid to a container.

The machine 1 may further optionally include a waste container 69 for storing waste water. In this regard, the waste container 69 is positioned below the cup station 13 and is operatively connected to the cup station 13 and blending unit 3 and optionally includes a waste water pump connected to a bottom end of the blending container 43 to assist to drain washing water from the blending container 43. The machine 1 may also include one or more housings which are refrigerated at a temperature between 1° and 5° Celsius and substantially sealed with the temperature inside controlled by the control unit 17. The housing may for example contain the one or more foodstuff containers 57. In another embodiment the entire outer body casing 4 of the machine 1 may be refrigerated.

Figure 9:
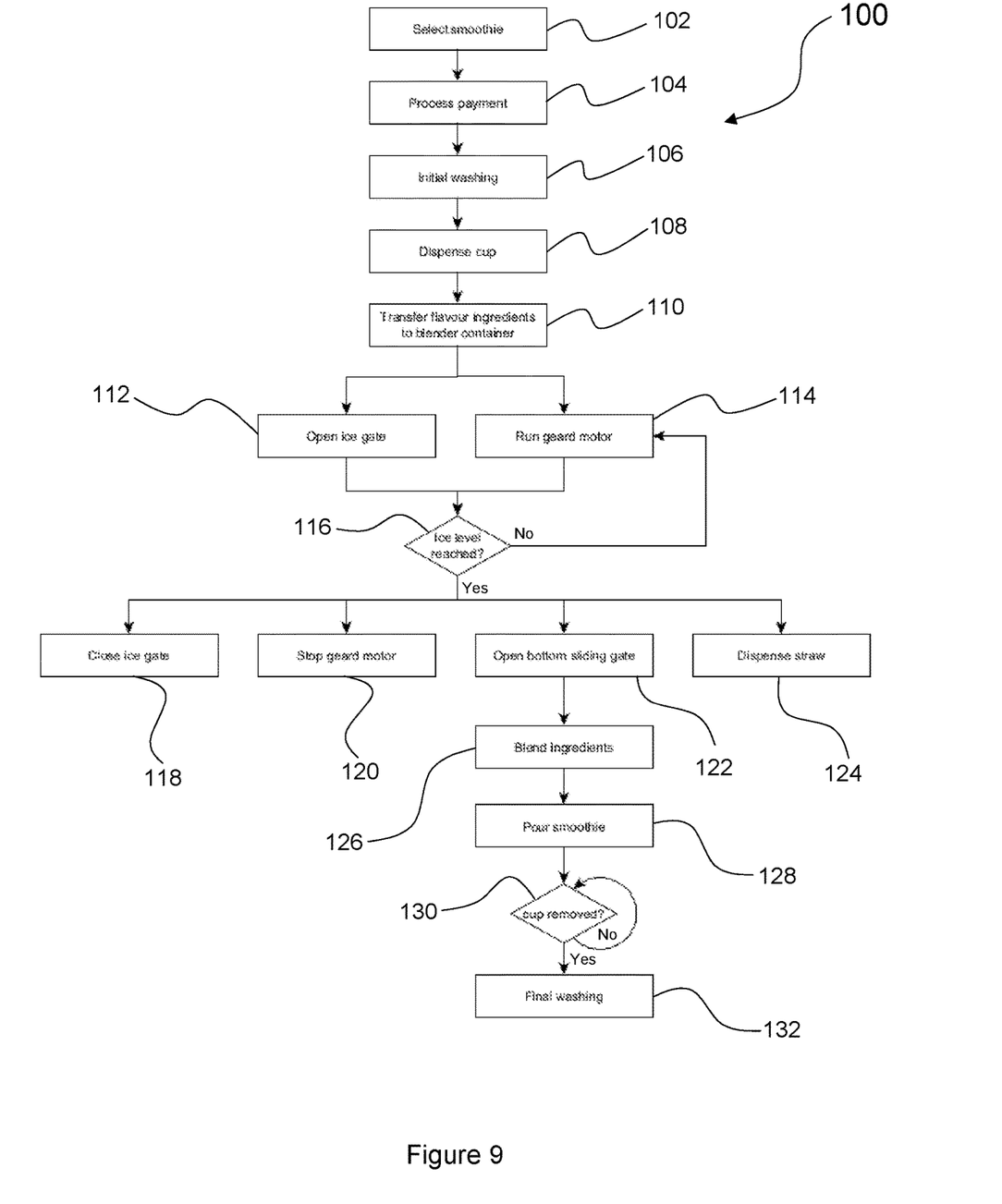
FIG. 9 is a flowchart of the preferred operation of the machine illustrated in FIG. 1.

With reference in FIG. 9, there is shown a flowchart 100 illustrating a preferred method of operating the machine 1. The optional user interface (not illustrated in the drawings) may have a menu display on a screen which allows a user at step 102 to select the desired smoothie beverage. After the desired smoothie flavour is selected, payment of the beverage is made at step 104. At step 106, an initial wash of the blending container 43 may be performed with a source of sanitizing liquid or rinse washing water supplied from the wash water container 63. A cup is then dispensed from the cup dispenser 12 and dropped into a cup holder in the cup station 13 at step 108. At step 110, the control unit 17 activates the foodstuff pumps 61 corresponding to the required ingredients, thereby transferring the ingredients required to make the desired smoothie to the blending container 43. The volume of each foodstuff ingredient transferred to the blending container 43 is controlled by the control unit 17 based on the running time of the foodstuff pumps 61. At step 112, the control unit 17 activates the opening of the first sliding gate 27 and at step 114, activates the geared motor 35 such that the radial arms 33 of the ice agitator commence rotation. The control unit 17 also instructs the actuating mechanism to retract the bendable spout 41 such that the bendable spout 41 is moved to the folded position in readiness for blending.

With the ice agitator in operation, the rotation of the radial arms 33 urges quantities of ice particles lying in and around the annular trough 23 of the ice storage compartment 7 to be discharged from the discharge opening 25 and into the chute 19 where the ice particles are able to accumulate on the second sliding gate 29 which remains closed by the control unit 17.

Once the ice level sensors 39 detect at step 116 that the predetermined ice level within the chute 19 has been reached, the control unit 17 activates the first sliding gate 27 to close the discharge opening 25 at step 118. Simultaneously, at step 120 the control unit 17 stops the geared motor 35 rotating the ice agitator and at step 122 opens the second sliding gate 29 allowing the ice particles to be released down through the ice chute 19 and into the blender container 43. In this respect, the control unit 17 may also activate the ice push mechanism (not illustrated in the drawings) which assists in pushing the ice particles out of the chute 19 and into the blending container 43. Alternatively, the ice chute 19 may be maintained at a certain temperature over approximately 10° C. to assist the ice particles to slide out of the chute 19. At step 124, a straw may also be dispensed by the straw dispenser.

After transferring all the ingredients required into the blending container 43, including the ice particles and flavour, the control unit 17 at step 126 activates a blender motor of the blending unit 3 to operate at an appropriate speed for a predetermined time interval, thereby causing the blending of the ingredients of the desired smoothie. If a cup for some reason has been removed or is not held in the cup station 13, the control unit 17 may also at this time activate the cup dispenser 12 to position a cup in the cup holder of the cup station 13 which is positioned below the bendable spout 41 of the blending unit 3. The cup dispenser 12 may also be able to supply cups of different sizes. Alternatively, no cup may be dispensed if the user provides a reusable cup.

At step 128, the control unit 17 then activates the actuating mechanism to impart rotation of the spool 47 such that the bendable spout 41 is moved from the folded position such that the blended beverage can be dispensed from the spout 41 into the underlying serving cup. During this time, the blender motor is run at high speed generating a centrifugal force that urges the blended beverage to be discharged through the bendable spout 41.

The blended container 43 may be rinsed with water from the washing water container 63 after blending each beverage, and/or sanitized with a sanitizing liquid, such as, for example, soap or detergent. Alternatively, the blender container 43 may be rinsed with water only after blending each beverage and then periodically, for example daily, be sanitized. A source of sanitising liquid may be operatively connected to the blending unit 3 via an associated pump. The blender container 43 being rinsed and/or sanitised after each use advantageously prevents cross-flavour contamination, eliminates germs and eliminates the need for manual washing.

If it is determined at step 130 that the serving cup has been removed from the cup station 13, the control unit 17 at step 132 activates the actuating mechanism to retract the bendable spout 41 such that the spout is returned to the folded position, and upon transferring washing water from washing water container 63 and optionally washing liquid into the blender container 43, the control unit 17 activates the blender motor to run at an appropriate speed for a predetermined time interval thereby washing the interior of the blender container 43. The control unit 17 then activates the actuating mechanism to release the bendable spout 41 to the unfolded position thereby enabling the washing water contained within the blender container 43 to be discharged from the bendable spout 41 and into the underlying waste container 69. During this time, the blender motor advantageously runs at high speed generating a centrifugal force that urges the waste water to be discharged through the bendable spout 41.

The ice dispensing unit 5 of the present invention is advantageously able to dispense accurate portions of ice without requiring a connection to an external water line or access to a floor drain. Further, the ice dispensing unit 5 advantageously averts the need for a conventional ice making unit which is usually expensive, cumbersome and has high energy consumption. The blending unit 3 of the present invention is also advantageously able to produce and pour a thick smoothie without requiring the blending container 43 to be turned upside down and shaken. Further, the blending unit 3 does not require the entire blending unit 3 to be tilted in order to pour the contents of the blending container 43. Also, the bendable spout 41 provides a pouring system which advantageously leaves behind less than 10 ml of blended ingredients in the blending container 43 and only requires approximately 150 ml of water for washing, thereby making the blending unit 3 environmentally friendly.

Although the invention has primarily been described with reference to a machine incorporating both the blending unit 3 and the ice dispensing unit 5, the blending unit 3 could separately be incorporated into a machine for dispensing a beverage. Likewise, the ice dispensing unit could separately be incorporated into a machine for dispensing an ice beverage.

The invention claimed is:

1. A machine for dispensing an ice beverage, the machine including a blending unit for blending the constituents of an ice beverage, and an ice dispensing unit for supplying ice to the blending unit, the ice dispensing unit including a portion control device for measuring a predetermined quantity of ice required for blending, the blending unit including a bendable spout for selectively releasing blended constituents from the blending unit, wherein the ice dispensing unit further includes a storage compartment for storing ice, the storage compartment being operatively connected to the portion control device, and wherein the portion control device includes a chute operatively connected between the storage compartment and the blending unit, a first closure and a second closure spaced apart for selectively closing a section of the chute, the first closure being positioned towards the storage compartment and the second closure being positioned towards the blending unit, and wherein ice from the storage compartment accumulates in the chute before being released to the blending unit after the ice accumulated reaches the predetermined quantity, the first closure being in an open position and the second closure being in a closed position when ice is accumulating to the predetermined quantity.

2. The machine for dispensing an ice beverage as claimed in claim 1 wherein the portion control device further includes a sensor for detecting when ice accumulated in the chute reaches the predetermined quantity.

3. The machine for dispensing an ice beverage as claimed in claim 2 wherein the storage compartment includes a lower platform having an annular trough with a discharge opening provided in a bottom area of the trough, the discharge opening being connected to a first end of the chute.

4. The machine for dispensing an ice beverage as claimed in claim 3 wherein the ice dispensing unit further includes an ice agitator for urging ice particles through the discharge opening, the ice agitator including a rotatory shaft and a plurality of radial arms extending outwardly from the rotatory shaft.

5. The machine for dispending an ice beverage as claimed in claim 4 wherein at least a section of each radial arm substantially conforms to a contour of the annular trough.

6. The machine for dispensing an ice beverage as claimed in claim 5 wherein the annular trough of the lower platform includes one or more upwardly projecting ice crusher blades for reducing the size of ice particles.

7. The machine for dispensing an ice beverage as claimed in claim 6 wherein the ice dispensing unit further includes a geared motor operatively connected to the ice agitator to drive rotation of the rotary shaft.

8. The machine for dispensing an ice beverage as claimed in claim 7 wherein the ice dispensing unit further includes a control unit for controlling operation of the geared motor and the first and second closures, and wherein, in response to the sensor detecting ice accumulated in the chute has reached the predetermined quantity, the control unit stops the geared motor and activates the first closure to close and the second closure to open, thereby allowing the predetermined quantity of ice to be released into the blender unit.

9. The machine for dispensing an ice beverage as claimed in claim 8 wherein the portion control device further includes an ice push mechanism for pushing ice particles through the chute and into the blending unit, the ice push mechanism being controlled by the control unit.

10. The machine for dispensing an ice beverage as claimed in claim 9 wherein the blending unit further includes an actuating mechanism for imparting movement to the bendable spout, the actuating mechanism being controlled by the control unit.

11. The machine for dispensing an ice beverage as claimed in claim 10 wherein the bendable spout is moveable by the actuating mechanism between a folded position in which blended constituents are restrained from release and an unfolded position in which blended constituents are released from the spout.

12. The machine for dispensing an ice beverage as claimed in claim 11 wherein the actuating mechanism includes a spool, a drive motor for rotating the spool, and a cable operatively connected to the bendable spout and spool, and wherein when the spool is rotated by the drive motor in a first direction, the spout is moved to the folded position and when the spool is rotated by the drive motor in an opposite second direction, the spout is moved to an unfolded position.

13. The machine for dispensing an ice beverage as claimed in claim 12 wherein the actuating mechanism further includes first and second pulleys positioned on either side of the spool, the cable extending around said pulleys between the spool and the spout.

14. The machine for dispensing an ice beverage as claimed in claim 1 further including a rinsing and washing system for rinsing and/or washing the blending unit, the rinsing and washing system including a wash water container connected to the blending unit for supplying wash water to the blending unit.

15. The machine for dispensing an ice beverage as claimed in claim 1 further including one or more ingredient containers connected to the blending unit via conduits, the one or more ingredient containers being operatively connected to a transfer pump controlled by a control unit.

* * * * *